United States Patent Office 3,842,040
Patented Oct. 15, 1974

3,842,040
MANUFACTURE OF POLYESTERS
Anthony Arthur Briarly Browne and James Eric McIntyre, Harrogate, England, assignors to Imperial Chemical Industries Limited, London, England
No Drawing. Filed July 9, 1973, Ser. No. 377,184
Claims priority, application Great Britain, July 21, 1972, 34,202/72; Nov. 14, 1972, 52,551/72
Int. Cl. C08g 17/003
U.S. Cl. 260—75 M                                  20 Claims

ABSTRACT OF THE DISCLOSURE

The manufacture of a poly(alkylene arylene dicarboxylate) by reaction of an aromatic dicarboxylic acid in the solid state with an ester-forming derivative of a diol having no free hydroxy groups wherein a major part of the reaction mass forms a solid phase throughout the reaction.

---

The present invention relates to the manufacture of polyesters by reaction in the solid phase.

In the manufacture of polyesters, the initial stage may be the reaction of a dicarboxylic acid with a diol or with ethylene oxide the resultant ester or mixture of ester and oligomers being thereafter subjected to polycondensation, at least initially in the liquid phase, the final stages possibly being carried out in the solid phase. Thus hitherto solid phase polycondensation has demanded previous preparation of a suitable form of prepolymer, for example in the form of particles, demanding special equipment.

According to the present invention we provide a process for manufacture of a poly(alkylene arylene dicarboxylate) wherein an aromatic dicarboxylic acid in the solid state is reacted with an ester-forming derivative of a diol having no free hydroxyl groups to form a poly(alkylene arylene dicarboxylate), wherein reaction conditions are so controlled that throughout the reaction a major part of the reaction mass forms a solid phase.

Preferably the aromatic dicarboxylic acid should be in particulate form. Preferably particulate form should be retained throughout the reaction.

Preferably the whole of the reaction medium apart from the ester-forming derivative of the diol, should be solid. Preferably the ester-forming derivative should be in the vapour state.

However, we include the situation wherein a minor proportion of the condensed phase is liquid, provided that the bulk of the condensed phase retains a particulate form throughout the reaction. This liquid component, when it exists, may consist of a minor amount of a low-melting intermediate ester or oligomeric ester or of a minor amount of ester-forming derivative of a diol absorbed into or condensed upon the solid particles. Similarly, minor amounts of catalytic additives may be present as liquid provided that the bulk of the condensed phase retains a particulate form.

Advantageously, the reaction may be carried out under fluidised bed conditions in order to improve uniformity of reaction conditions, to facilitate intimate contact between the partculate solid aromatic dicarboxylic acid and the ester-forming derivative when in the vapour state and to minimise adhesion of the particles by sintering.

In the term "poly(alkylene arylene dicarboxylate)" we include homopolyesters and also copolyesters in which a minor proportion of the alkylene groups and/or the arylene dicarbxylate groups are of structure different from that of the major proportion.

The advantages of solid phase polycondensation are well known. An advantage of the process of our invention is that since the esterification reaction also takes place in the solid phase, the polycondensation to form high molecular weight poly(alkylene arylene dicarboxylate) can be carried out without the need for intermediate solidification of a reaction melt followed by comminution to a suitable particle size. This is particularly advantageous when the solid phase is in a particulate form.

Aromatic dicarboxylic acids for use in the process of our invention must melt at a temperature above the reaction temperature, preferably at a temperature at least 100° C. above the reaction temperature. Particularly preferable for use in the invention are aromatic dicarboxylic acids with melting points above 300° C., such as terephthalic acid, naphthalene-2,6-dicarboxylic acid, naphthalene-2,7-dicarboxylic acid, 1,2 - diphenoxyethane-p,p'-dicarboxylic acid, 1,4-diphenoxy butane-p,p'-dicarboxylic acid, biphenyl-4,4'-dicarboxylic acid, diphenyl sulphone-4,4'-dicarboxylic acid, bibenzyl-4,4'-dicarboxylic acid, stilbene-4,4'-dicarboxylic acid, 1,2 - di-p-carboxybenzoyloxy-ethane and 1,6-di-p-carboxybenzoamido hexane. More than one such high-melting aromatic dicarboxylic acid may be present, subject to certain restrictions outlined later. Minor amounts of lower melting dicarboxylic acids, including aliphatic acids such as adipic acid, may be present but if more than about 10% of an acid melting below the reaction temperature is present a solid particulate structure can no longer be maintained.

Suitable ester-forming derivatives of diols are, for example, alkylene oxides, particularly ethylene oxide, diol carbonates, particularly ethylene carbonate, diol diacylates, particularly ethylene glycol diacetate and diol sulphites, particularly ethylene sulphite.

The polyester produced by the process must melt at a temperature above the final polymerisation temperature. In practice this means that the polyester should preferably melt at a temperature above 200° C. Consequently not all combinations of otherwise suitable aromatic dicarboxylic acids and ester-forming derivatives of diols are suitable for use in the process of our invention. Among combinations that are suitable are the following:

| Acid | Ester-forming derivative of diol |
|---|---|
| Terephtholic acid | Ethylene oxide. |
| Naphthalene-2,6-dicarboxylic acid | Do. |
| Naphthalene-2,7-dicarboxylic acid | Do. |
| 1,2-diphenoxyethane-p,p'-dicarboxylic acid | Do. |
| 1,4-dipenoxybutane-p,p'-dicarboxylic acid | Do. |
| Biphenyl-4,4'-dicarboxylic acid | Do. Oxetane. 3,3-dimethyl oxetane |
| Diphenyl sulphone-4,4'-dicarboxylic acid | Ethylene oxide. Oxetane. 3,3-dimethyloxetane |
| Bibenzyl-4,4'-dicarboxylic acid | Ethylene oxide. |
| Stilbene-4,4'-dicarboxylic acid | Do. |
| 1,2-di-p-carboxybenzoyloxyethane | Do. |
| 1,6-di-p-carboxybenzamido hexane | Do. |

It is a feature of the process of our invention that reaction of the dicarboxylic acid with the derivative of the diol and polycondensation occur simultaneously within the bed, so that polymer and unchanged aromatic acid are both present at an intermediate stage of the process, with only a minor amount of low-melting oligomeric species. This situation contrasts with conventional processes for polyester manufacture, in which a high concentration of low-melting oligomeric species is built up at an intermediate stage, and virtually all the free aromatic dicarboxylic acid is consumed before manufacture of polymeric species commences.

In the case particularly of the use of ethylene oxide as a reactant, the presence of a basic compound as catalyst for the initial esterification reaction is advantageous. Suitable basic compounds include organic bases such as tertiary amines, tertiary phosphines, quaternary ammonium hydroxides, and quaternary phosphonium hydroxides. Polymeric and non-polymeric bases may be used. Where a volatile, non-polymeric base is used, it is gradually removed from the reaction bed by volatilisation. In such cases further volatile base may be supplied to the bed by volatilising it into the gas stream before it reaches the bed. It is not essential to incorporate the basic compound in the solid before commencing reaction, for instance a volatile basic compound may be supplied in the gas stream and is then absorbed by the solid. The polycondensation may be catalysed by known polycondensation catalysts, for example, compounds of antimony, germanium, tin, or titanium.

It is important to obtain a balance between esterification by the ester-forming derivative of the diol and polycondensation reactions such that the concentration of low-melting oligomeric species remains low. The temperature at which such a balance can be attained depends upon polymer structure, vapour feed rate, and catalyst concentrations, but will usually lie within the range 160–240° C. It will be understood that where a separate final powder polymerisation is carried out the temperature of this step may be above 240° C. if the product melting point is sufficiently high, and also that our process may be carried out in such a way that the reaction temperature is increased as the degree of conversion into polymer increases, and in such cases the temperature in the latter stages may exceed 240° C.

The process may be carried out either batchwise or continuously.

The poly(alkylene arylene dicarboxylates) of our invention are suitable for the manufacture of fibres, films or mouldings.

In the following Examples of our invention all parts are by weight.

Example 1

Terephthalic acid (100 parts) in the form of particles of size passing a sieve of mesh aperture 30$\mu$ and held on a sieve of mesh aperture 300$\mu$ was slurried in a solution of triphenyl phosphine (1 part) in dry chloroform. Tetra-isopropyl titanate (0.2 part) was added and the chloroform evaporated off with continued stirring. The solid residue was dried at 60° C. and 15 mm. Hg pressure then charged into a pre-heated fluid bed reactor consisting essentially of a vertical cylinder with a sintered glass support near the foot, a gas inlet below the sintered glass support, and a baffle near the top to prevent entrainment of solid particles out of the reactor.

A thermocouple pocket just above the sintered glass support allowed measurement of the temperature in the fluidised bed. The reactor was surrounded by a cylindrical oven.

Heated nitrogen was passed through the reactor at atmospheric pressure at a rate of 7.5 parts per minute until the bed temperature settled at 210° C., then a mixture of hot nitrogen (3.75 parts per minute) and ethylene oxide (5.89 parts per minute) was passed through the reactor for 4 hours, the temperature being maintained at 210° C. throughout. Finally the bed was allowed to cool to room temperature with passage of nitrogen.

The product was worked up by extracting it successively with hot chloroform, cold 10% sodium carbonate solution, water, cold 2N hydrochloric acid, and water, then dried. The residue (4.2 parts) was poly(ethylene terephthalate) of melting point 244° C. and intrinsic viscosity ($\mu$) 0.33.

Example 2

To terephthalic acid (100 parts) of particle size according to Example 1, 30–300$\mu$ was added a solution of the polyamide from N,N'-bis-3-amino-propylpiperazine and adipic acid (Viscosity Ratio 1.70) (1.5 part) in water (100 parts). The mixture was thoroughly blended then dried at 60° C. and 15 mm. Hg pressure. Tetra-isopropyl titanate (0.2 part) in chloroform (10 parts) was thoroughly mixed in and the chloroform was evaporated off. The solid residue was dried at 60° C. and 15 m. Hg pressure, then reacted with ethylene oxide as described in Example 1 but for 8 hours at 210° C. instead of 4 hours. The product was worked up as in Example 1. The residue (76 parts) was poly(ethylene terephthalate).

Example 3

To terephthalic acid (100 parts) of particle size diameter according to Example 1 was added a solution of 2-hydroxyethyl trimethylammonium hydroxide (1 part) in methanol (100 parts). The mixture was thoroughly blended then dried at 60° C. and 15 mm. Hg pressure. Tetra-isopropyl titanate (0.2 part) in chloroform (100 parts) was added, thorough mixing effected and the chloroform evaporated off. The solid residue was dried at 60° C. and 15 mm. Hg pressure, then reacted with ethylene oxide as described in Example 1. The product was worked up as in Example 1. The residue (18 parts) was poly(ethylene terephthalate).

Example 4

Terephthalic acid (100 parts) of particle diameter 2–150$\mu$ was blended with triphenyl phosphine (1 part) and tetra-isopropyl titanate (0.2 part) as described in Example 1.

The reaction procedure was as described in Example 1 with the exception that the reactor temperature was maintained at 228° C., and the ethylene oxide, diluted with nitrogen, was passed for 5 hours. After following the working up procedure described in Example 1, poly(ethylene terephthalate) (51 parts) was obtained as a powder.

The powder was returned to the fluidising reactor and heated at 228° C. for 2 hours in a stream of nitrogen (7.5 parts per minute) before allowing to cool under nitrogen.

The powdered product was melt spun, through a single hole spinneret, to give a continuous filament, which could be readily drawn over a hot pin.

Example 5

Terephthalic acid (100 parts) of particle diameter 2–150$\mu$ was blended with triphenyl phosphine (1 part) as described in Example 1, but without the addition of tetra-isopropyl titanate.

After carrying out the reaction and working up procedure as described in Example 1, but using a reaction temperature of 206° C., poly(ethylene terephthalate) (52 parts) was obtained in powder form.

Example 6

65 parts of powdered terephthalic acid of mean particle size 27$\mu$ were blended with 0.65 parts of triphenyl phosphine and 0.13 parts of tetra isopropyl titanate. The blend was charged to a fluidising reactor and heated to 200° C. in a stream of nitrogen (7.5 parts min.$^{-1}$). The nitrogen stream was replaced by a reactive gas stream consisting of 5.63 parts min.$^{-1}$ of nitrogen and 2.95 parts min.$^{-1}$ of ethylene oxide. After 10 hours 58 parts of poly(ethylene terephthalate) of I.V. 0.30 (1% solution in o-chlorophenol at 25° C.) were present along with carboxylic acids. After 11 hours all the terephthalic acid had been converted to polymer. Continuing the exposure to the reactive gas gave polymer I.V. 0.44 after 15 hours and I.V. 0.49 after 20 hours. Further powder polymerisation for 16 hours under nitrogen alone gave polymer I.V. 0.57. The polymer was removed from the reactor and melt-spun. The spun yarn was drawn at a ratio of 3:1; the drawn yarn had a tenacity of 1.92 g. p decitex and an extensibility of 30%.

Example 7

30 parts of powdered terephthalic acid of mean particle size 27$\mu$ were blended with 0.017 parts of finely divided antimony trioxide. The blend was heated to 200° C. in a fluidising reactor in a stream of nitrogen (7.5 parts min.$^{-1}$). The nitrogen stream was replaced by a reactive gas mixture consisting of 5 parts min.$^{-1}$ of nitrogen and 2.95 parts min.$^{-1}$ of ethylene oxide. 0.002 parts of triphenyl phosphine in 0.62 parts of nitrogen were fed per minute into the reactive gas stream. After 5 hours 2.4 parts of poly(ethylene terephthalate) were present in the solid particulate reaction mixture. After 10 hours 50% of the terephthalic acid had been converted to poly(ethylene terephthalate), and after 15 hours all the terephthalic acid had been converted to polymer of I.V. 0.42.

Examples 6 and 7 show the progressive conversion of terephthalic acid to poly(ethylene terephthalate).

Example 8

65 parts of 1,2-bis (4 carboxyphenoxy) ethane were blended with 0.65 parts of triphenyl phosphine and 0.13 parts of tetra isopropyl titanate. The blended acid was heated at 210° C. in a stream of diluted ethylene oxide for 20 hours as described in Example 1. All the acid was converted to polymer powder. A sample of the powder was pressed at 270° C. to give a clear film of I.V. 0.72; a further sample was melt spun at 300° C. and drawn to give a strong flexible yarn.

Example 9

65 parts of naphthalene - 2,6 - dicarboxylic acid were blended with 0.65 parts of triphenyl phosphine and 0.13 parts of tetra isopropyl titanate. The blended acid was heated at 200° C. in a stream of diluted ethylene oxide for 25 hours as described in Example 1. All the acid was converted to polymer powder which was film- and fibre-forming.

Example 10

65 parts of biphenyl - 4,4' - dicarboxylic acid were blended with 0.65 parts of triphenyl phosphine and 0.13 parts of tetra isopropyl titanate. The blended acid was heated at 210° C. in a stream of diluted ethylene oxide for 20 hours as described in Example 1. 15 parts of polymer were isolated from unreacted acid by extraction of the acid by dilute sodium carbonate.

Example 11

65 parts of sulphonyl - 4,4' - dibenzoic acid were blended with 0.65 parts of triphenyl phosphine and 0.13 parts of tetra isopropyl titanate. The blended acid was heated at 200° C. in a stream of diluted ethylene oxide for 20 hours as described in Example 1. 42 parts of polymer were isolated from unreacted acid by extraction of the acid by dilute sodium carbonate.

What we claim is:

1. A process for the manufacture of a poly(alkylene arylene dicarboxylate) wherein an aromatic dicarboxylic acid in the particulate solid state is reacted with an ester-forming derivative of a diol having no free hydroxyl groups to form a poly(alkylene arylene dicarboxylate), wherein reaction conditions are so controlled that throughout the reaction a major part of the reaction mass forms a particulate solid phase.

2. A process according to Claim 1 wherein the whole of the reaction medium apart from the ester-forming derivative of the diol is solid.

3. A process according to Claim 1 wherein the ester-forming derivative is in the vapour state.

4. A process according to Claim 1 wherein reaction is carried out under fluidised bed conditions.

5. A process according to Claim 1 wherein the aromatic dicarboxylic acid is of melting point above 300° C.

6. A process according to Claim 1 wherein the aromatic dicarboxylic acid is terephthalic acid, naphthalene-2:6-dicarboxylic acid, naphthalene-2:7-dicarboxylic acid, 1:2-diphenoxyethane - 4:4' - dicarboxylic acid, 1:4 - diphenoxy butane - 4:4' - dicarboxylic acid, biphenyl - 4:4' - dicarboxylic acid, diphenyl sulphone - 4,4' - dicarboxylic acid, bibenzyl - 4:4' - dicarboxylic acid, stilbene - 4:4'-dicarboxylic acid, 1:2 - di - p - carboxybenzoyloxyethane or 1:6 - di - p - carboxybenzamido hexane.

7. A process according to Claim 1 wherein the derivative of a diol is an alkylene oxide.

8. A process according to Claim 1 wherein the derivative of a diol is a diol carbonate.

9. A process according of Claim 1 wherein the derivative of a diol is a diol diacylate.

10. A process according to Claim 1 wherein the derivative of a diol is a diol sulphite.

11. A process according to Claim 7 wherein the derivative of a diol is ethylene oxide.

12. A process according to Claim 1 wherein the reactants are chosen so that the resultant polyester is of melting point above 200° C.

13. A process according to Claim 7 wherein a catalytic amount of a basic compound is present.

14. A process according to Claim 13 wherein the proportion of catalytic basic compound present is from 0.05 to 2.0 percent by weight, based on the dicarboxylic acid.

15. A process according to Claim 13 wherein the catalytic basic compound is a tertiary amine, a tertiary phosphine, a quaternary ammonium hydroxide or a quaternary phosphonium hydroxide.

16. A process according to Claim 1 wherein the ester-forming derivative of a diol is vapourised into a chemically inert gas which is passed through the mass of aromatic dicarboxylic acid.

17. A process according to Claim 15 wherein the ester-forming derivative of a diol is vapourised into a chemically inert gas which is passed through the mass of aromatic dicarboxylic acid and the proportion of catalytic basic compound present is attained or maintained by volatilisation of the catalyst into the inert gas.

18. A process according to Claim 1 wherein the reaction is carried out with the temperature within the range 160–240° C.

19. A process according to Claim 1 wherein a polyesterification catalyst is present.

20. A process according to Claim 19 wherein the polyesterification catalyst is a compound of antimony, germanium, tin or titanium.

References Cited

UNITED STATES PATENTS 2,806,052  9/1957  Siggel.
3,617,226  11/1971  List et al.
3,639,448  2/1972  Matsuzawa et al.

MELVIN GOLDSTEIN, Primary Examiner

U.S. Cl. X.R.

260—475 P

UNITED STATES PATENT OFFICE
CERTIFICATE OF CORRECTION

Patent No. 3,842,040     Dated October 15, 1974

Inventor(s) Anthony Arthur Briarly BROWNE and James Eric MCINTYRE

It is certified that error appears in the above-identified patent and that said Letters Patent are hereby corrected as shown below:

Column 1, line 69, delete "dicarbxylate" and insert --dicarboxylate--

Column 2, line 43, delete "terephtholic" and insert --terephthalic--

Column 3, line 67, delete "(µ)" and insert --(η)--

Column 4, line 2, delete "m" and insert --mm--

Signed and sealed this 6th day of May 1975.

(SEAL)
Attest:

RUTH C. MASON
Attesting Officer

C. MARSHALL DANN
Commissioner of Patents
and Trademarks